United States Patent
Buerli et al.

(10) Patent No.: US 12,299,340 B2
(45) Date of Patent: May 13, 2025

(54) MULTI-DEVICE CONTINUITY FOR USE WITH EXTENDED REALITY SYSTEMS

(71) Applicant: APPLE INC., Cupertino, CA (US)

(72) Inventors: Michael E. Buerli, San Francisco, CA (US); Andrew P. Richardson, San Francisco, CA (US); Samuel L. Iglesias, Palo Alto, CA (US); Tyler R. Calderone, Cupertino, CA (US); Mark A. Ebbole, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/187,734

(22) Filed: Feb. 26, 2021

(65) Prior Publication Data

US 2021/0326094 A1    Oct. 21, 2021

Related U.S. Application Data

(60) Provisional application No. 63/011,982, filed on Apr. 17, 2020.

(51) Int. Cl.
| | |
|---|---|
| G06F 3/04883 | (2022.01) |
| G06F 3/01 | (2006.01) |
| G06F 3/0481 | (2022.01) |
| G06F 3/04817 | (2022.01) |
| G06F 3/0482 | (2013.01) |
| G06F 3/04842 | (2022.01) |
| G06F 3/04845 | (2022.01) |
| G06F 3/14 | (2006.01) |

(Continued)

(52) U.S. Cl.
CPC ........... *G06F 3/1454* (2013.01); *G06F 3/013* (2013.01); *G06F 3/017* (2013.01); *G06F 3/0481* (2013.01); *G06F 3/04817* (2013.01); *G06F 3/0482* (2013.01); *G06F 3/04845* (2013.01); *G06F 3/165* (2013.01); *G06F 9/451* (2018.02); *G06T 7/70* (2017.01); *H04M 1/72409* (2021.01)

(58) Field of Classification Search
None
See application file for complete search history.

(56) References Cited

U.S. PATENT DOCUMENTS

| | | |
|---|---|---|
| 8,576,276 B2 | 11/2013 | Bar-Zeev et al. |
| 8,730,156 B2 | 5/2014 | Weising et al. |

(Continued)

FOREIGN PATENT DOCUMENTS

WO    WO 2019/067899    4/2019

OTHER PUBLICATIONS

Invitation to Pay from PCT/US2021/023447, dated Jun. 29, 2021, 20 pages.

(Continued)

*Primary Examiner* — Jordany Nunez
(74) *Attorney, Agent, or Firm* — BAKERHOSTETLER

(57) ABSTRACT

Implementations of the subject technology provide continuous transfer of content editing and/or control between various devices in an extended reality system. The extended reality system includes at least one device that is capable of determining the locations of other devices in the system. This device can manage continuous transfer of control between other devices in the system responsive to three-dimensional location-based user inputs, and/or can manage continuous transfer of control between one or more of the other devices and the device itself.

20 Claims, 10 Drawing Sheets

(51) Int. Cl.
  *G06F 3/16*     (2006.01)
  *G06F 9/451*    (2018.01)
  *G06T 7/70*     (2017.01)
  *H04M 1/72409*  (2021.01)

(56) References Cited

U.S. PATENT DOCUMENTS

| | | | |
|---|---|---|---|
| 9,508,194 B1 | 11/2016 | Worley, III | |
| 9,652,125 B2* | 5/2017 | Penha | H04N 21/47211 |
| 9,685,003 B2 | 6/2017 | Lazarow et al. | |
| 9,686,346 B2* | 6/2017 | Gardenfors | H04L 67/10 |
| 9,972,119 B2 | 5/2018 | Long | |
| 10,042,599 B2* | 8/2018 | Clarke | G06F 3/033 |
| 10,097,591 B2* | 10/2018 | Hymel | H04L 65/1069 |
| 10,339,721 B1* | 7/2019 | Dascola | G06F 3/0482 |
| 2006/0241792 A1* | 10/2006 | Pretlove | G06Q 50/00 700/83 |
| 2009/0300535 A1* | 12/2009 | Skourup | G06F 3/011 715/773 |
| 2013/0187835 A1* | 7/2013 | Vaught | G06F 3/011 345/7 |
| 2013/0198392 A1* | 8/2013 | Hymel | G06F 3/013 709/227 |
| 2013/0219303 A1* | 8/2013 | Eriksson | G06F 3/1454 715/759 |
| 2015/0193982 A1 | 7/2015 | Mihelich et al. | |
| 2016/0370858 A1* | 12/2016 | Leppänen | H04N 21/4316 |
| 2016/0370956 A1* | 12/2016 | Penha | H04N 21/47211 |
| 2018/0351373 A1* | 12/2018 | Behzadi | G06F 3/04817 |
| 2019/0065027 A1* | 2/2019 | Hauenstein | G06F 3/0484 |
| 2019/0139317 A1* | 5/2019 | Bilbrey | H04N 21/4788 |
| 2020/0004335 A1* | 1/2020 | Komaki | A61B 5/398 |
| 2020/0051527 A1* | 2/2020 | Ngo | H04N 5/57 |
| 2020/0106965 A1* | 4/2020 | Malia | G06F 3/04883 |
| 2021/0011556 A1* | 1/2021 | Atlas | G06F 3/0304 |

OTHER PUBLICATIONS

International Search Report and Written Opinion from PCT/US2021/023447, dated Aug. 19, 2021, 25 pages.
European Office Action from European Patent Application No. 21718995.0, dated Sep. 15, 2023, 7 pages.
European Office Action from European Patent Application No. 21718995.0, dated Feb. 29, 2024, 7 pages.

* cited by examiner

MULTI-DEVICE CONTINUITY FOR USE WITH EXTENDED REALITY SYSTEMS

CROSS REFERENCE TO RELATED APPLICATIONS

This application claims the benefit of priority to U.S. Provisional Patent Application No. 63/011,982, entitled "Multi-Device Continuity For Use With Computer-Generated Reality Systems," filed on Apr. 17, 2020, the disclosure of which is hereby incorporated herein in its entirety.

TECHNICAL FIELD

The present description relates generally to extended reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user while the user views the physical environment via the augmented reality technology.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
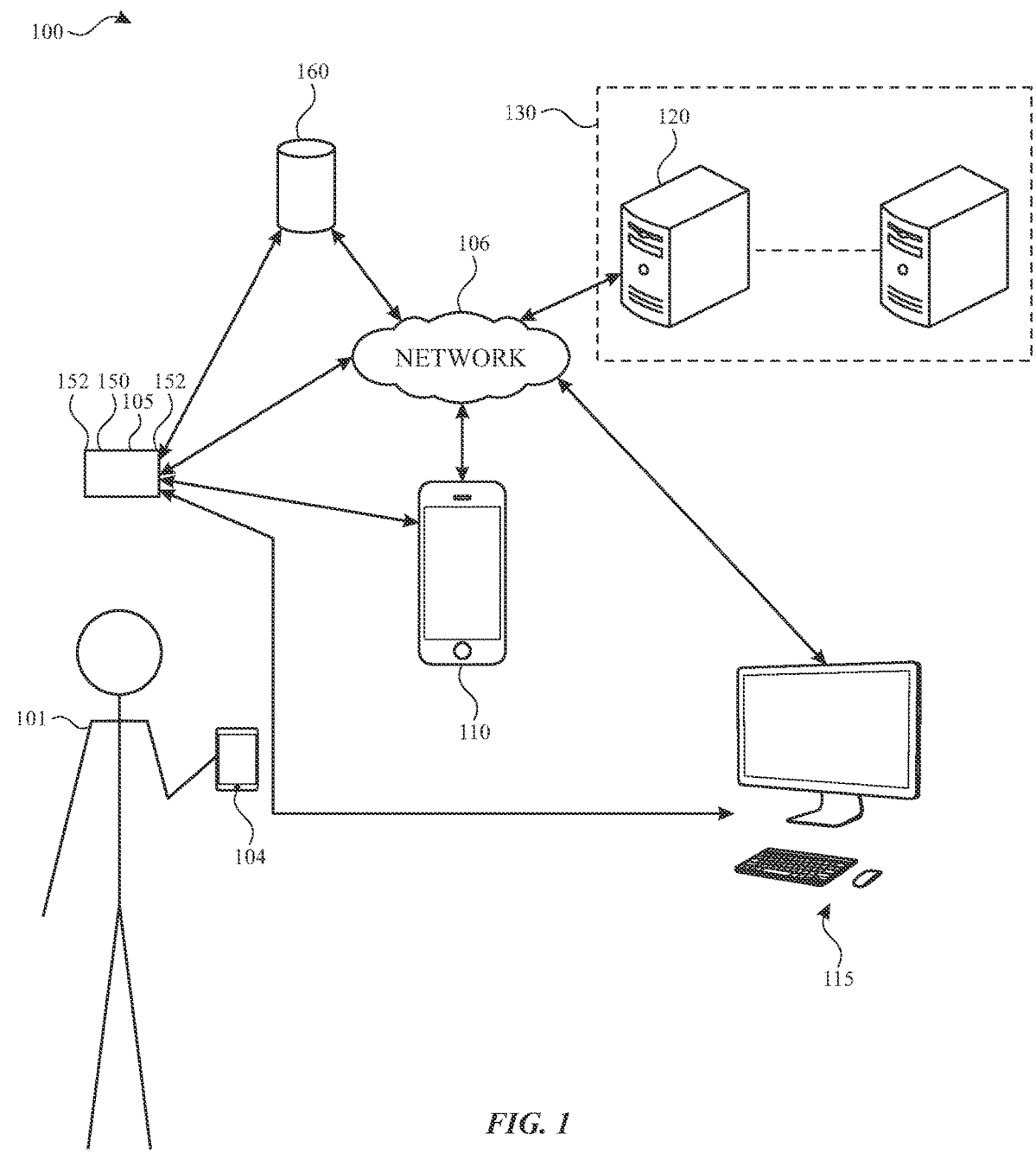
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide transfer of content, editing control of the content, and/or control of one or more applications from one device to another device, using an XR system. For example, with the subject technology, a user drafting an email on their smart phone can place the smartphone in the field of view of an XR device (e.g., a tablet device or a head mountable system) and continue drafting the email in an XR environment created by the XR device. In another example, with the subject technology, a user using an XR device (e.g., a user holding a tablet device or wearing a head mountable system) in a physical environment that includes a smart speaker device and the user's smart phone may look at or gesture toward the smart speaker device. Responsive to a detection of the user looking at or gesturing toward the smart speaker device by the XR device, a song that is playing on the user's phone can be transferred to play on the smart speaker device. Three-dimensional information regarding the devices in the physical environment can be gathered by the XR device, and used to facilitate smooth and continuous transfer of control and/or content between the devices and/or the XR device.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, a smart speaker device 160, and a server 120. For explanatory purposes, the system architecture 100 is illustrated in FIG. 1 as including the electronic device 105, the handheld electronic device 104, the electronic device 110, the electronic device 115, the smart speaker device 160, and the server 120; however, the system architecture 100 may include any number of electronic devices, and any number of servers or a data center including multiple servers. In some implementations, the electronic device 105, the handheld electronic device 104, the electronic device 110, the electronic device 115, and/or the smart speaker device 160 may be registered to and/or associated with a same user account, such as via the server 120.

The electronic device 105 may be an XR device such as a smartphone, a tablet, or a head mountable portable system (e.g., a head mountable display device that can be worn by a user), that includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, time-of-flight sensors, radar sensors, sonar sensors, GPS sensors, Wi-Fi sensors, near-field communications sensors, radio frequency sensors, eye-tracking sensors, etc. Moreover, the electronic device 105 may include hardware elements that can receive user input such as hardware buttons or switches. User input detected by such sensors and/or hardware elements correspond to various input modalities for initiating generating supplemental virtual content within a given extended reality environment. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect a presence of a person, object, device, and/or an occurrence of an event in a scene to initiate providing supplemental virtual content within the extended reality environment.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

In some implementations, a transfer of editing control of, for example, a word processing document, an email, a text message, and/or or content for another application can be provided from one device to another (e.g., from electronic device 110 to electronic device 115) when one device is detected within the proximity of the other device to initiate the transfer of control. In this type of proximity based transfer, electronic device 110 may indicate to electronic device 115 that it is providing editing control of the word processing document to electronic device 115, and can provide the current state of the document to electronic device 115. However, in this type of proximity-based transfer, electronic device 115 is not aware of the 3D position or orientation of the electronic device 110, nor of the state and/or display characteristics of the displayed UI on the electronic device 110.

In an implementation, electronic device 105 can transfer content from one device to another (e.g., from electronic device 110 to electronic device 115, from electronic device 110 to smart speaker device 160, from electronic device 115 to smart speaker device 160), including from an application running on one device to an application running on another device. For example, electronic device 105 may transfer drafting of an email on electronic device 110 for continued drafting of the email using electronic device 105 in an XR space. In another example, while a song is playing in a media application running on electronic device 110, a user of electronic device 105 may gesture or look at smart speaker device 160 to transfer the song that is currently playing to the smart speaker device 160 for continuous, uninterrupted play of the song.

In an implementation, the electronic device 105 can obtain (e.g., from the processor of electronic device 110 and/or using a camera of the electronic device 105), the state and/or display characteristics of the displayed UI on the electronic device 110 and can transfer control of the editing of the displayed UI to the electronic device 105 while maintaining the state and/or display characteristics of the previously displayed UI.

The network 106 may communicatively (directly or indirectly) couple, for example, the electronic device 105, the electronic device 110, the smart speaker device 160, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 13. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a set-top box configured to interface with an external display such as a television. a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 13.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120, and/or information for generating/rendering such content.

Smart speaker device 160 may include one or more microphones for accepting audio (e.g., voice) input, one or more acoustic devices such as speakers, communications circuitry for communicating with electronic device 110, electronic device 115, network 106, electronic device 105, and/or handheld electronic device 104, memory for storing information and/or code for one or more applications, and/or processing circuitry. The smart speaker device 160 may be, and/or may include all or part of, the electronic system discussed below with respect to FIG. 13.

Figure 2:
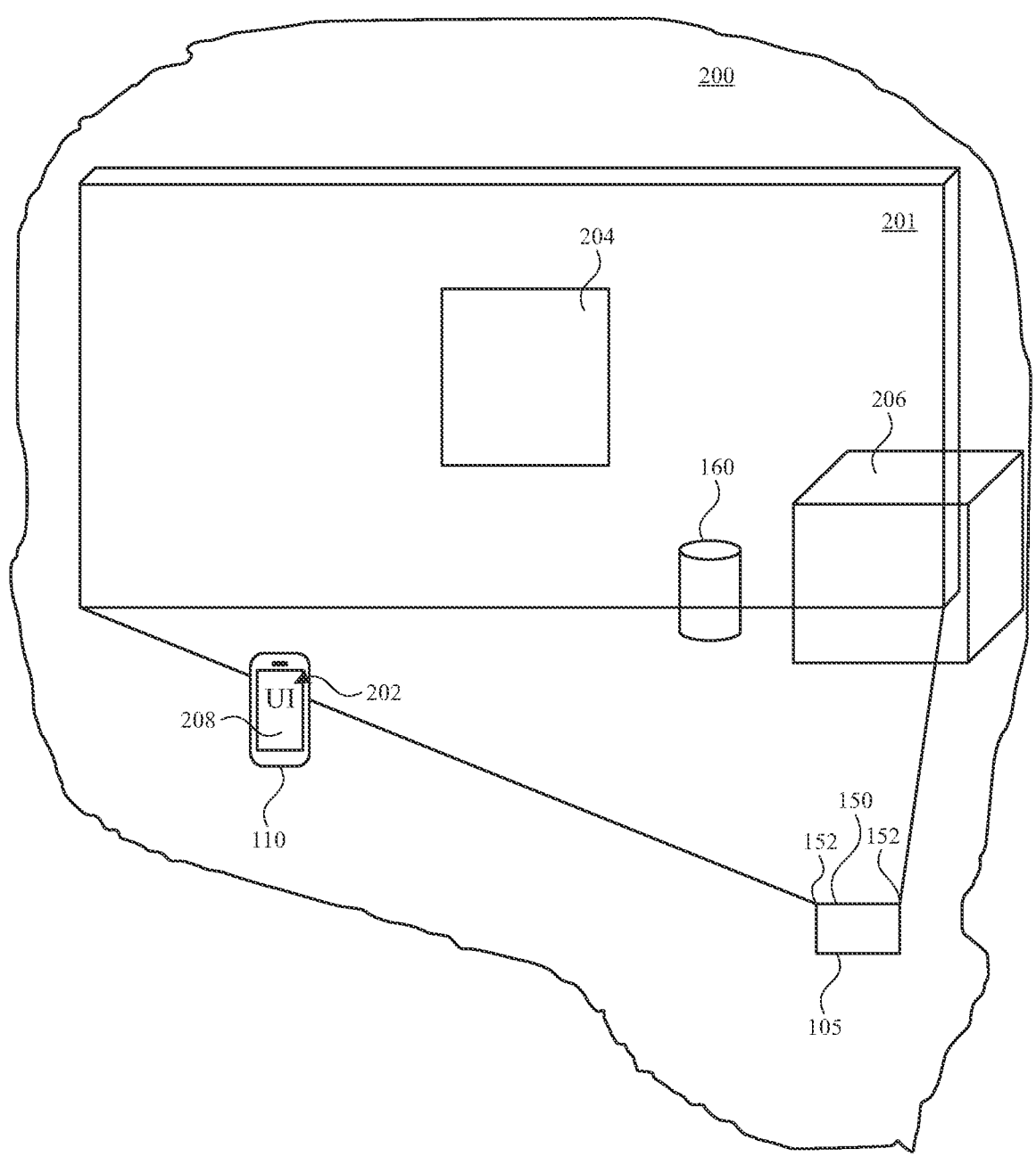
FIG. 2 illustrates an example of a physical environment of an electronic device and additional devices in accordance with one or more implementations of the subject technology.

FIG. 2 illustrates an example of a physical environment in which an electronic device 105, electronic device 110, and smart speaker device 160 are provided. In the example of FIG. 2, a user 101 wears an electronic device 105 in a physical environment 200. The physical environment 200, in the example of FIG. 2, includes a physical object 206, a portion of which can be viewed by user 101 via display 201 (e.g., based on images (from one or more cameras such as camera(s) 150) that are provided to an opaque implementation of display 201 or directly through a transparent or translucent implementation of display 201) and portions of which can be viewed directly by the user without the use of any technology (if not otherwise blocked from view).

In the example of FIG. 2, computer-generated content is being displayed by display 201 (e.g., overlaid on or in front of portions of physical environment 200) in an XR environment. In this example, an application window 204 (e.g., a file manager application window, a browser window, a social medial application window, a media player application window, a content editor application window, or any other application user interface) representing an application is displayed by display 201, with which user 101 can interact in the XR environment. In this example, smart speaker device 160 is partially visible via display 201, and a user interface 202 of an application running on electronic device 110 is separately displayed, by electronic device 110, on a display 208 of electronic device 110.

Figure 3:
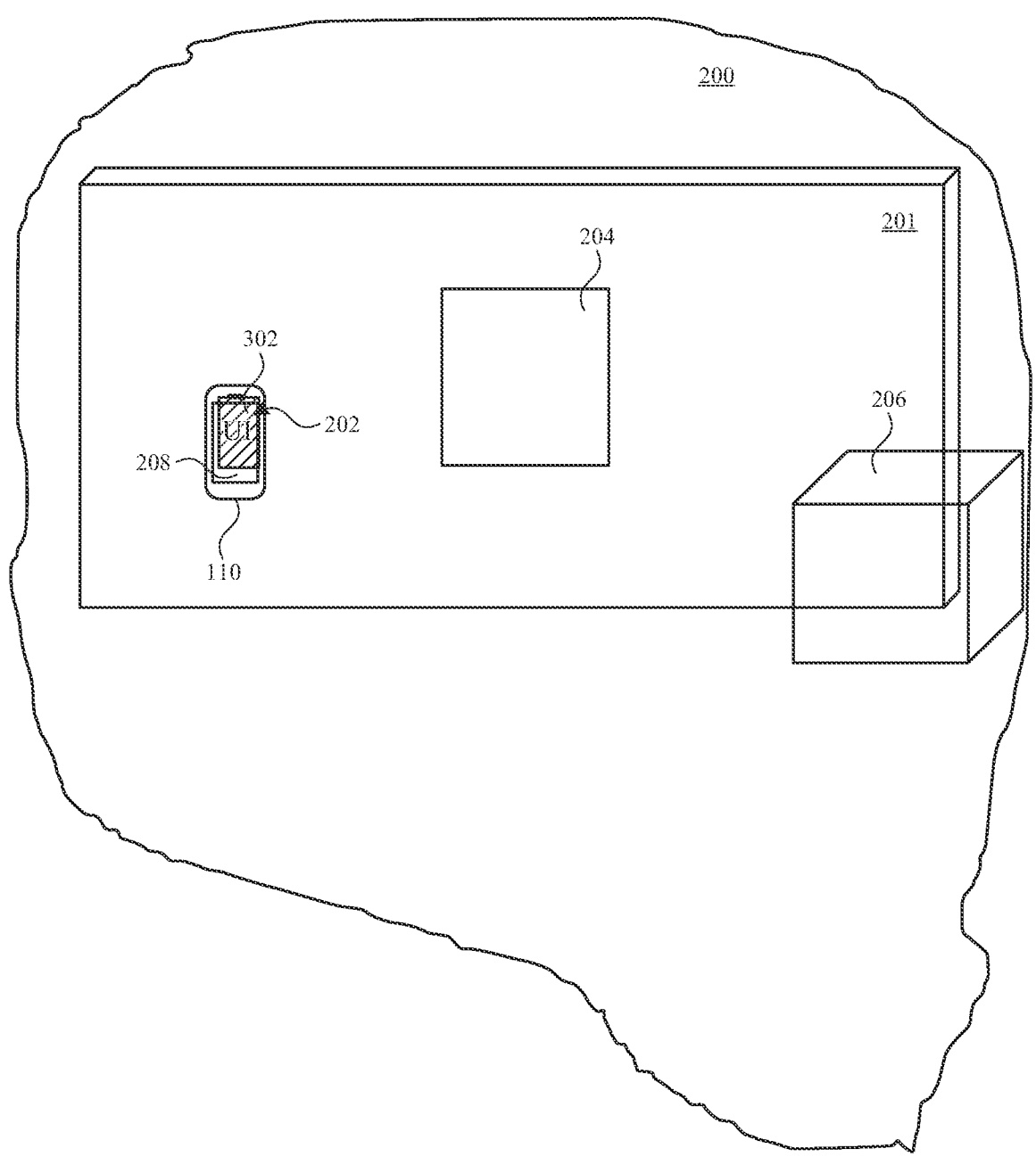
FIG. 3 illustrates aspects of a user interface generated by an electronic device based on the location and orientation of another electronic device in accordance with one or more implementations of the subject technology.

FIG. 3 illustrates the environment of FIG. 2, in an arrangement in which the electronic device 110 is within the field of view of an electronic device such as electronic device 105, and visible via a display such as display 201 of electronic device 105. Although various examples are discussed herein in connection with electronic device 105, it should be appreciated that other electronic devices having one or more cameras and/or one or more depth sensors and/or other sensors can be used to perform some or all of the operations described connection with electronic device 105. In various implementations, electronic device 105 obtains three-dimensional (3D) information about electronic device 110 to facilitate transfer of control of the application running on electronic device 110 (and/or content associated therewith) to an application running on electronic device 105. In an example, electronic device 105 detects (e.g., using camera(s) 150 and/or sensors 152 and/or using information provided by electronic device 110 to electronic device 105 such as via wireless communication between the electronic device 110 and electronic device 105) the 3D location, orientation, and/or display location of a UI 202 of an application running on the electronic device 110. As shown in FIG. 3, using the 3D location, orientation, and/or display location, electronic device 105 may display an additional UI 302, with display 201 of electronic device 105, that is overlying and aligned with display 208 (e.g., overlaid on and aligned with the UI 202 that is still displayed on display 208) of electronic device 110.

UI 302 displayed by display 201 may be displayed with a size, a location, an orientation, and/or display characteristics that mimic the UI 202 displayed by display 208. For example, if the UI 202 on display 208 includes a partially drafted document in a word processing application or an email application with a flashing cursor at the location of a next text input, UI 302 displayed by display 201 can include the same partially drafted document in a word processing application or an email application at electronic device 105, with a flashing cursor displayed overlaid on the location of the flashing cursor on display 208. In one or more implementations, the UI 302 may include three-dimensional effects added to the UI 202 displayed by display 208. In this way, control of editing of the partially drafted document can be smoothly transitioned from electronic device 110 to electronic device 105. Because the electronic device 110 exists within the XR environment of electronic device 105 (e.g., within the field of view of the electronic device 105 and/or within the area corresponding to display 201), when the electronic device 105 takes control of the input to the UI, both the input that is accepted by the electronic device 105 and the output (e.g., display, tactile, audio) provided to the user responsive to the input is, at least initially, dependent on the detected characteristics and the state of the electronic device 110.

Figure 4:
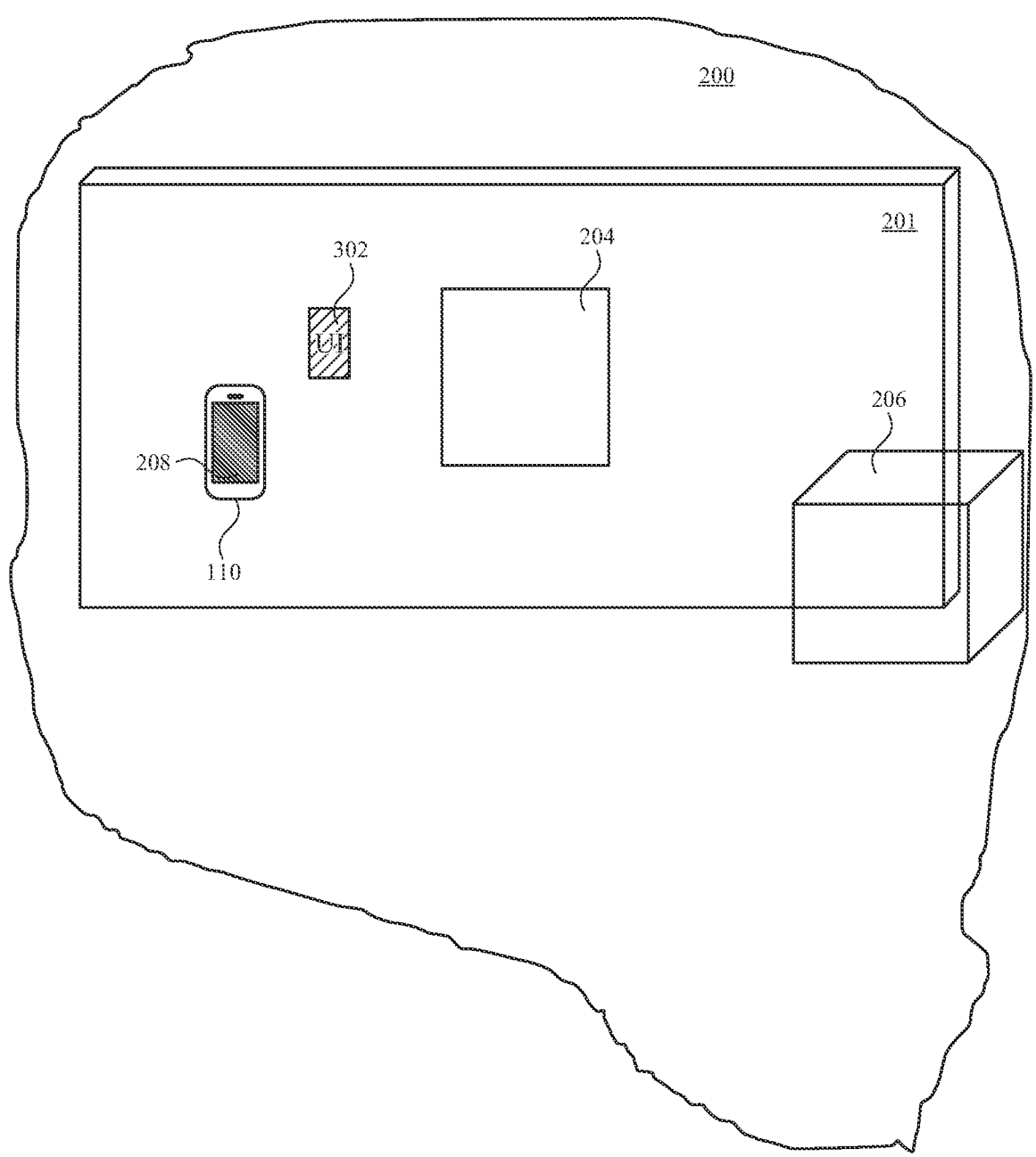
FIG. 4 illustrates aspects of user interface for an application after transfer of control of the application from one electronic device to another electronic device in accordance with one or more implementations of the subject technology.

FIG. 4 illustrates an example in which the UI 302 on display 201 has been moved (e.g., by a gesture input from user 101 and/or a gaze-based input from user 101 to electronic device 105) away from the location of electronic device 110. In the example of FIG. 4, control of the UI and/or the content therein has been completely transferred to electronic device 105. In the example of FIG. 4, display 208 of electronic device 110 no longer displays the UI 202 after electronic device 105 assumes control. For example, display 208 may be powered off or changed to a low power state, and/or the UI 202 and the associated application on electronic device 110 can be closed or deactivated when electronic device 110 determines that control of the application has been passed to electronic device 105. In various implementations, UI 202 and/or display 208 can be closed, powered off, and/or otherwise deactivated at the time that UI 302 is first displayed, after a period of time following the time when UI 302 is first displayed, when user input to UI 302 is detected, or when UI 302 is moved away from the location of display 208 (e.g., by a gesture input or other input from user 101). For example, electronic device 105 can send (e.g., via near-field communications, Wi-Fi communications, etc.) a notification to electronic device 110 that electronic device 105 has assumed control of the application content when the UI 302 is displayed or when the UI 302 is moved away from the location of electronic device 110.

In the example of a word processing UI, the UI 302 that is generated by the electronic device 105 allows the user 101 to continue editing the word processing document that was being edited in UI 202 on electronic device 110, via input to the electronic device 105 (e.g., via detection of the user's finger movements by the camera(s) 150 and/or sensor 152). After transfer of control to UI 302, UI 302 can be modified from an initially displayed UI that has a size, a position, an orientation, and/or an appearance that matches, and is (at least initially) overlaid on the corresponding UI 202 displayed on the electronic device 110. For example, UI 302 can be modified to a UI that leverages the advantages of electronic device 105. For example, UI 302 can be expanded in size, moved to a more convenient location in the XR environment, broken out into multiple (e.g., 3D distributed portions), etc.

In the example of FIGS. 2-4, a system is described that includes a first device (e.g., electronic device 110) configured to display a first user interface (e.g., UI 202) of an application running on the first device; and a second device (e.g., electronic device 105) configured to display computer generated content (e.g., application window 204) overlaid on a view of a physical environment (e.g., physical environment 200). In this example, the second device is configured to detect a position and an orientation of the first device in the physical environment; obtain a state of the first user interface of the application running on the first device; and display, at least partially overlaid on a view of the first device (see, e.g., FIG. 3) and based on the detected position and orientation of the first device, a second user interface (e.g., UI 302) corresponding to the application. The second user interface (e.g., UI 302) is displayed with the obtained state of the first user interface (e.g., UI 202).

In this example, in one or more implementations, the second user interface (e.g., UI 302) may be used to extend the first user interface (e.g., UI 202) beyond the bounds of the first device into the extended reality of the second device. For example, in one or more implementations, the first device may be a desktop computer or a laptop computer having a mouse or trackpad and a keyboard, with the second device continuing to provide an extended reality. With the trackpad or the mouse of the first device (or using a gesture input to the second device), a user may drag content, such as a window or application displayed within the bounds of the display of the first device, to a location that is outside of the bounds of the display of the first device and that is visible in the extended reality environment of the second device. In one or more implementations, applications running on the first device may be configured to define accessory windows for XR display outside the boundaries of that device, when an extended reality device is available. For example, a content editing application running on the first device can receive input from an additional toolbar displayed, by the second device, outside the bounds of the first device display (e.g., positioned closely to the display of the first device within the extended reality environment of the second device).

In the example of FIGS. 2-4, the second device may also be configured to receive a user input and, responsive to the user input, move the second user interface from a first location on a display of the second device to a second location on the display of the second device responsive to the user input (see, e.g., FIG. 3). The second device may also operate an application, at the second device, that corresponds to the application running on the first device, and provide an indication to the first device to deactivate the application at the first device. In one example, the application is a content editor application, and the state of the first user interface includes content previously input to the first device that is currently displayed in the first user interface (e.g., prior text or image input to a word processor, an email composer, or a messaging application), and an active indicator of an area within the first user interface for input of additional content. For example, the content editor application may include a text entry field, and the active indicator may be a cursor in the text entry field.

In another example, the application is a media player application, and the state of the first user interface includes an indicator (e.g., a name or another identifier) of media (e.g., a song or a video) that is currently being played by the second device, and an indicator of a current playback time of the media in the media player application. In another example, the application is a social media application, and the state of the first user interface includes an indication of a selectable link displayed in the social media application. For example, the selectable link may be a link to another social media user page, a link to a "like" button, etc. that can be replicated (e.g., in appearance and/or function) in the second user interface to provide continuous functionality before and after transfer of control from the electronic device 110 to the electronic device 105.

Figure 5:
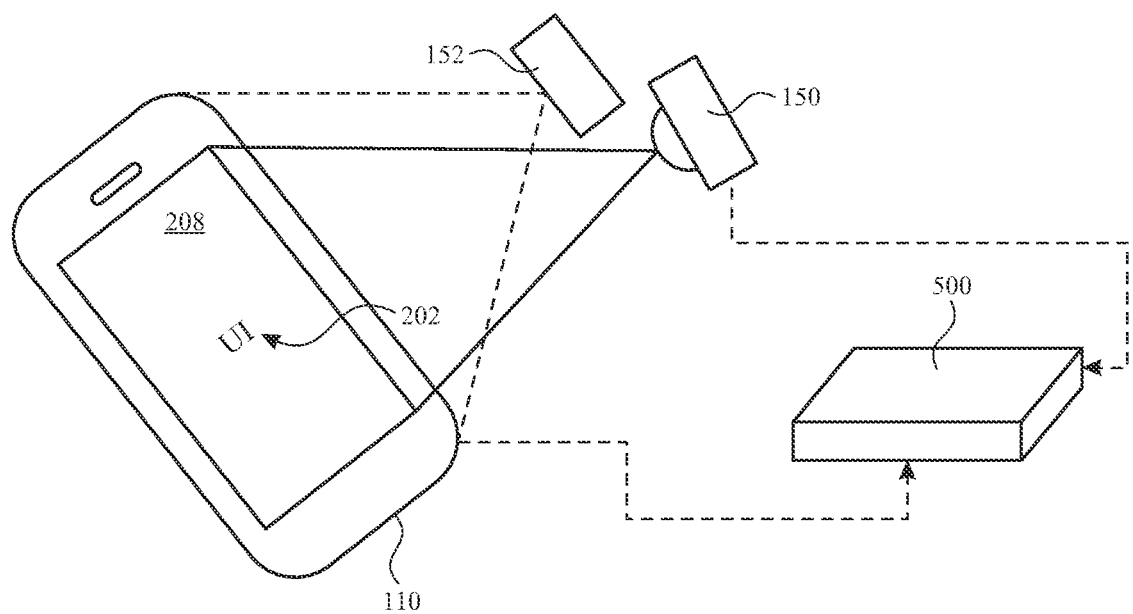
FIG. 5 illustrates a schematic diagram illustrating the use of cameras and/or sensors of one electronic device to determine the location and orientation of another electronic device in accordance with one or more implementations of the subject technology.

FIG. 5 illustrates how, for example, using camera(s) 150 and/or sensors 152 (e.g., depth sensors) of electronic device 105 can detect and track the position, orientation, and size of the electronic device 110, display 208, and/or UI 202. For example, images from camera(s) 150 and/or sensor data from sensors 152 of electronic device 105 can be provided to a processor 500 of the electronic device 105. Processor 500 may determine the state, location, orientation, and/or appearance of the UI 202 currently being displayed on display 208 of electronic device 110, using the images from camera(s) 150 and/or sensor data from sensors 152 of electronic device 105. Processor 500 can then generate UI 302 having the same or similar state and appearance as UI 202. FIG. 5 also illustrates how alternatively, or in addition, the state and appearance of the UI 202 currently being displayed by display 208 can be provided to the processor 500 separately (e.g., wirelessly from the electronic device 110 or via the cloud, such as via server 120) for use in generating UI 302 having the same or similar state and appearance as UI 202.

Electronic device 110 may, in one or more implementations, send the electronic device 105 state and/or context information regarding the application that is being used by electronic device 110 (e.g., that a document that is open, etc.). Handoff logic between electronic device 110 and electronic device 105 may include, for example, a handoff request from electronic device 105 to electronic device 110 (e.g., responsive to a detection of electronic device 110 by electronic device 105), handoff operations performed by electronic device 110 and/or electronic device 105, and/or a handoff confirmation provided from electronic device 105 to electronic device 110. This handoff logic can be via a direct peer-to-peer connection and/or facilitated by a cloud server such as server 120. Electronic device 105, electronic device 110, smart speaker device 160, and/or other devices of system architecture 100 may be associated with a same user account which allows the devices to form a secure communication channel for communicating, such as by using a private key associated with the user account.

In one or more implementations, continuous communication between the devices may occur throughout the handoff process. In some examples described herein, electronic device 105 may take a snapshot of the UI 202 displayed on the electronic device 110 and then display that snapshot again through the electronic device 105. In other examples described herein, the UI 302 generated by the electronic device 105 can also, or alternatively, be driven by UI data provided by the electronic device 110. The electronic device 105 can render a UI 302, for display in an XR environment, based UI information (e.g., information describing the content and/or layout of the UI 202 and/or a rendered UI) sent from the electronic device 110 to the electronic device 105. The UI information may include a display tree that includes nodes corresponding to each of the UI elements displayed in the UI 202 on the electronic device 110. The electronic device 105 may then use the provided display tree and re-render UI 302 for an XR environment. Re-rendering UI 302 for the XR environment may including determining the size, location, and/or orientation of the UI 302 based on the images from camera(s) 150 and/or the three-dimensional information from sensors 152 (e.g., including depth sensor information). Electronic device 110 may continue to send updates to the UI information when the UI 202 changes and while the handoff to electronic device 105 is still in progress.

In various implementations, while the UI 302 is overlaid on UI 202 (e.g., as in the example of FIG. 3), new inputs from user 101 (e.g., to continue editing a document therein or controlling a media player therein) can be provided to electronic device 110 (e.g., by touch inputs on display 208 or other inputs to electronic device 110) or to electronic device 105 (e.g., via detection of the user's finger movements, other gestures, voice inputs, or eye-tracking inputs with camera(s) 150 and/or sensors 152), such as depending on whether the handoff has been completed.

Figure 6:
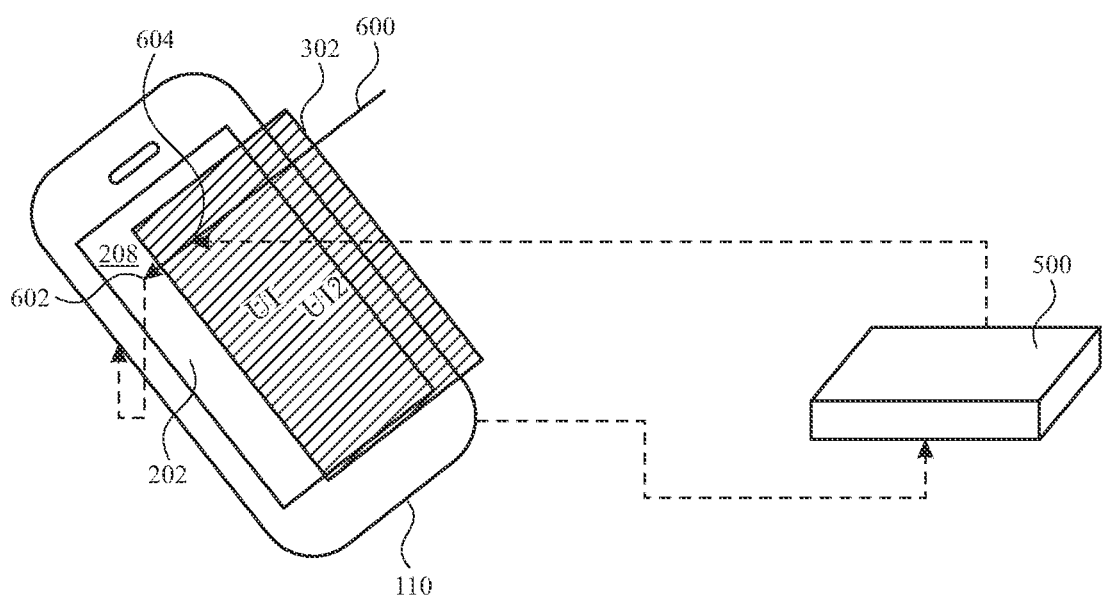
FIG. 6 illustrates aspects of a first user interface overlaid by a second user interface in accordance with one or more implementations of the subject technology.

For example, FIG. 6 illustrates an example in which, UI 302 is overlaid on UI 202 and a touch input (indicated by arrow 600) is provided to display 208 of electronic device 110. In this example (which may occur immediately after the UI 302 is initially displayed but before electronic device 105 assumes control of the content within UI 202), the touch input at a particular location 602 on display 208 is accepted by electronic device 110 (e.g., by a processor of electronic device 110) and used to modify the UI 202 displayed on display 208. Information indicating the corresponding change to UI 202 (e.g., and/or information indicating the touch input location) can also be provided to processor 500 of electronic device 105 (e.g., via a wireless communication from electronic device 110 to electronic device 105) and/or can be detected by one or more camera(s) 150 and/or sensors 152 of electronic device 105. Based on the indication of the change to UI 202 (e.g., and/or the indication of the touch location), processor 500 makes a corresponding modification to UI 302.

In one operational scenario, if the user taps display 208 at a location 602 corresponding to a "skip" function of a media player application to skip a song or a video paying in the UI 202 to a next song or video, electronic device 110 may skip to the next song, make a corresponding update to UI 202 to indicate the next song is playing, and provide an indication of the update to UI 202 and the state of the next song that is playing to processor 500. Processor 500 may then update UI 302 to indicate the next song is playing, thus mimicking the change to UI 202, as if a gesture input had been received by processor 500 at a corresponding location 604 on UI 302. In another example, electronic device 105 detects the update to UI 202 directly (e.g., using camera(s) 150) and updates UI 302 accordingly based on the detection, as if a gesture input had been received by processor 500 at a corresponding location 602 on UI 302.

In another example operational scenario, electronic device 105 detects the application running on the electronic device 110, launches a local version of the application at electronic device 105, and then receives, from the electronic device 110, information describing any content being displayed by the electronic device 110. For example, the information describing the content may include a filepath corresponding to a file, a document, etc. In this example scenario, the electronic device 105 may translate touch inputs on the phone to touch inputs through the electronic device 105 version of the UI.

In the example of FIG. 6, UI 202 is displayed (e.g., under UI 302) while UI 302 is overlaid on the location of display 208. However, it should also be appreciated that, in the arrangement of FIG. 6, UI 202 may be disabled or deactivated, such that, although the processor(s) of electronic device 110 continue to control operation of the application corresponding to UI 202, UI 302 functions, at least temporarily, as the UI for the application running on electronic device 110 (e.g., by detecting inputs to UI 302 and providing the inputs to electronic device 110 to control the application accordingly).

Figure 7:
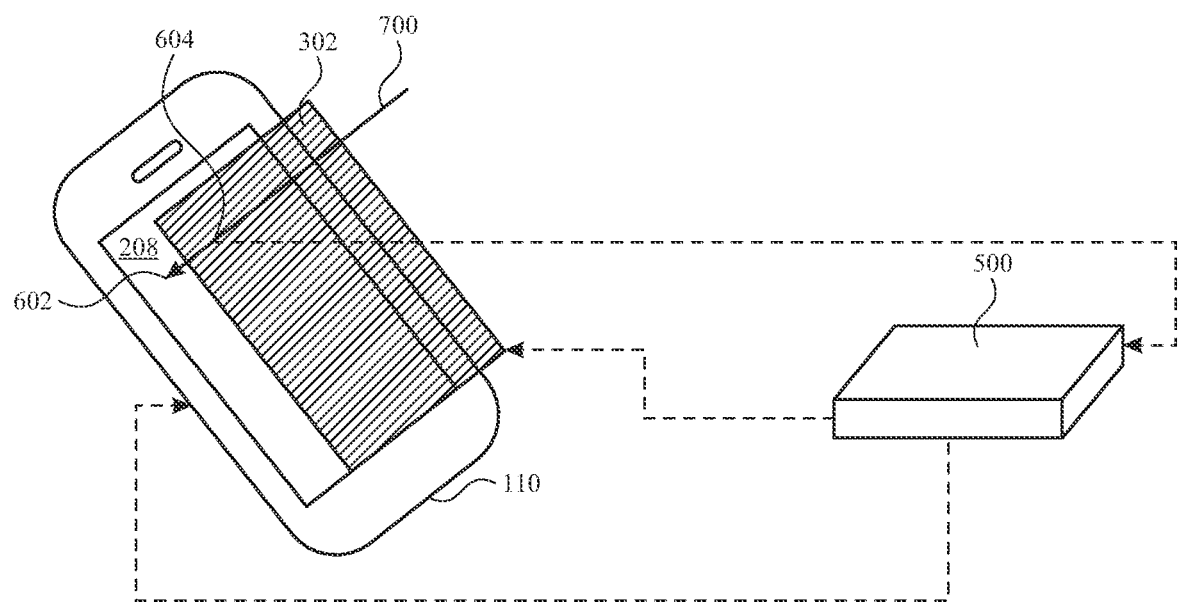
FIG. 7 illustrates other aspects of a first user interface overlaid by a second user interface in accordance with one or more implementations of the subject technology.

In the example of FIG. 6, while UI 302 is displayed over display 208, control of the application corresponding to UI 202 and/or UI 302 is maintained, at least initially, by electronic device 110. However, FIG. 7 illustrates another example in which, while UI 302 is displayed over display 208, control of the application corresponding to UI 302 has been transferred to processor 500 of electronic device 105. This transfer of control to electronic device 105 can be performed using the handoff logic described above in connection with, for example, FIG. 5. In this example, UI 202 can continue to be displayed by display 208, or display 208 can be powered off or discontinue display of UI 202.

As illustrated in FIG. 7, when the user provides a touch input at what appears to the user to be a location 602 on display 208 (e.g., as indicated by arrow 700), that touch input can be received by processor 500 (e.g., using camera(s) 150 and/or sensors 152) as a gesture input to UI 302 at a corresponding location 604. In this example, the gesture input at location 604 of UI 302 is obtained by processor 500, and processor 500 makes a corresponding update to UI 302, the content therein, and/or the application corresponding thereto. In an operational scenario in which UI 202 continues to be displayed on display 208, processor 500 may also provide an indication of the gesture input at location 604 or of the corresponding update to UI 302 and/or the underlying application to electronic device 110, so that electronic device 110 can make a corresponding update to UI 202. In the examples of FIGS. 2, 6, and 7, UI 302 is shown as being partially overlapping and separated spatially from the surface of electronic device 110. However, it should be appreciated that the UI 302 can be spatially separated as shown, or can be displayed by display 201 to appear to be directly on and/or completely overlapping the surface of electronic device 110.

Figure 8:
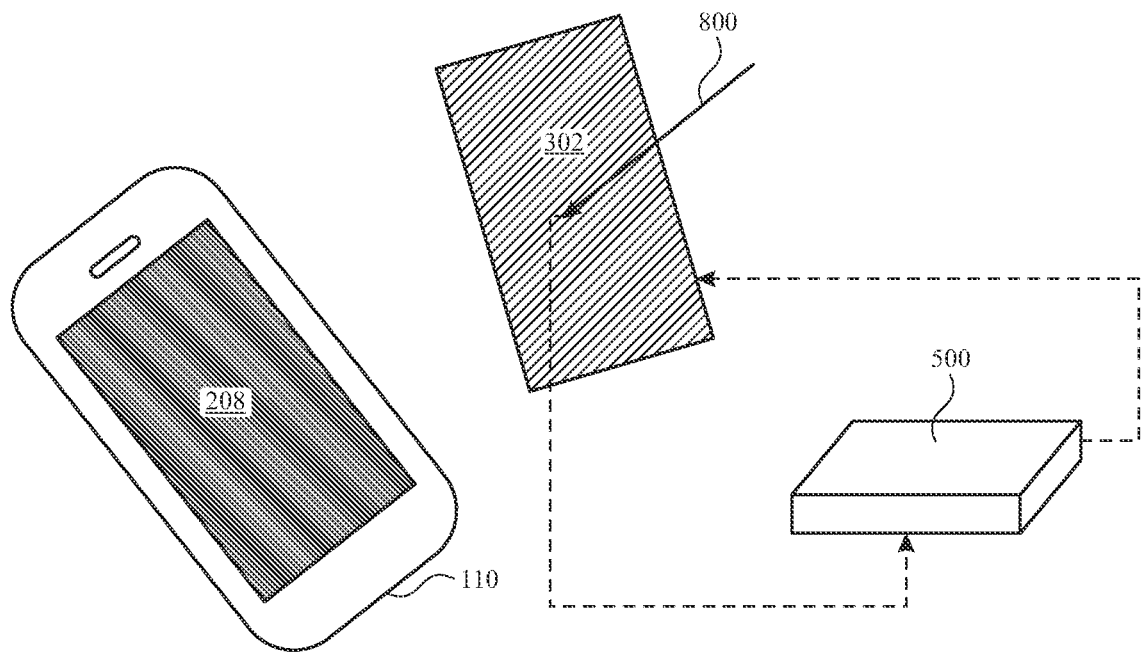
FIG. 8 illustrates aspects of a user interface generated by a first device that has been moved away from the location of a second device in accordance with one or more implementations of the subject technology.

As illustrated in FIG. 8, after the UI 302 provided by electronic device 105 is moved away from electronic device 110 (e.g., and display 208 stops displaying UI 202, deactivates UI 202, and/or display 208 is powered off or placed in a low power mode), control of the application corresponding to UI 302, control of UI 302 itself, and control of the content therein is handled by processor 500 of electronic device 105 (e.g., without further interaction with electronic device 110). In this example, UI 302 can be moved to any desired location in the XR environment of electronic device 105, resized, and/or otherwise modified while providing continuous control of the UI and/or the application previously provided by electronic device 110.

As shown in FIG. 8, a gesture input (e.g., as indicated by arrow 800) to UI 302 can be detected by processor 500 (e.g., based on images from camera(s) 150 and/or sensor data from sensors 152). The detected gesture input can be used by processor 500 to control the application corresponding to UI 302 and running on processor 500. Processor 500 may also make a modification to UI 302 corresponding to the detected gesture input. For example, arrow 800 may indicate user gesturing a tap on a key in a virtual keyboard displayed by display 201. Processor 500 may display the letter corresponding to the tapped key.

In order to return control of the content of UI 302 to electronic device 110 (e.g., including the letter added when the virtual keyboard was tapped by the user), the UI 302 can, for example be moved (e.g., using gesture or voice inputs to electronic device 105) to the location of display 208. Moving the UI 302 over at least a portion of display 208 may, for example, cause processor 500 to provide state information (e.g., including an indication of the newly input letter) for the content in UI to electronic device 110, and cause processor 500 to provide instructions to electronic device 110 to power on display 208 and open or activate UI 202 using the provided state information. In this way, continuity of control of various applications can be provided between various components of system architecture 100.

In the examples of FIG. 2-8, when the electronic device 110 is detected by electronic device 105 with a UI 202 displayed on display 208, a "matching" UI 302 (e.g., having the same size, location, orientation, and/or appearance) is generated over the display 208. However, in some operational scenarios, prior to or separately from generating a "matching" UI for display with the electronic device 105, the electronic device 105 can also act as an input device to the UI 202 and the associated application at electronic device 110.

Figure 9:
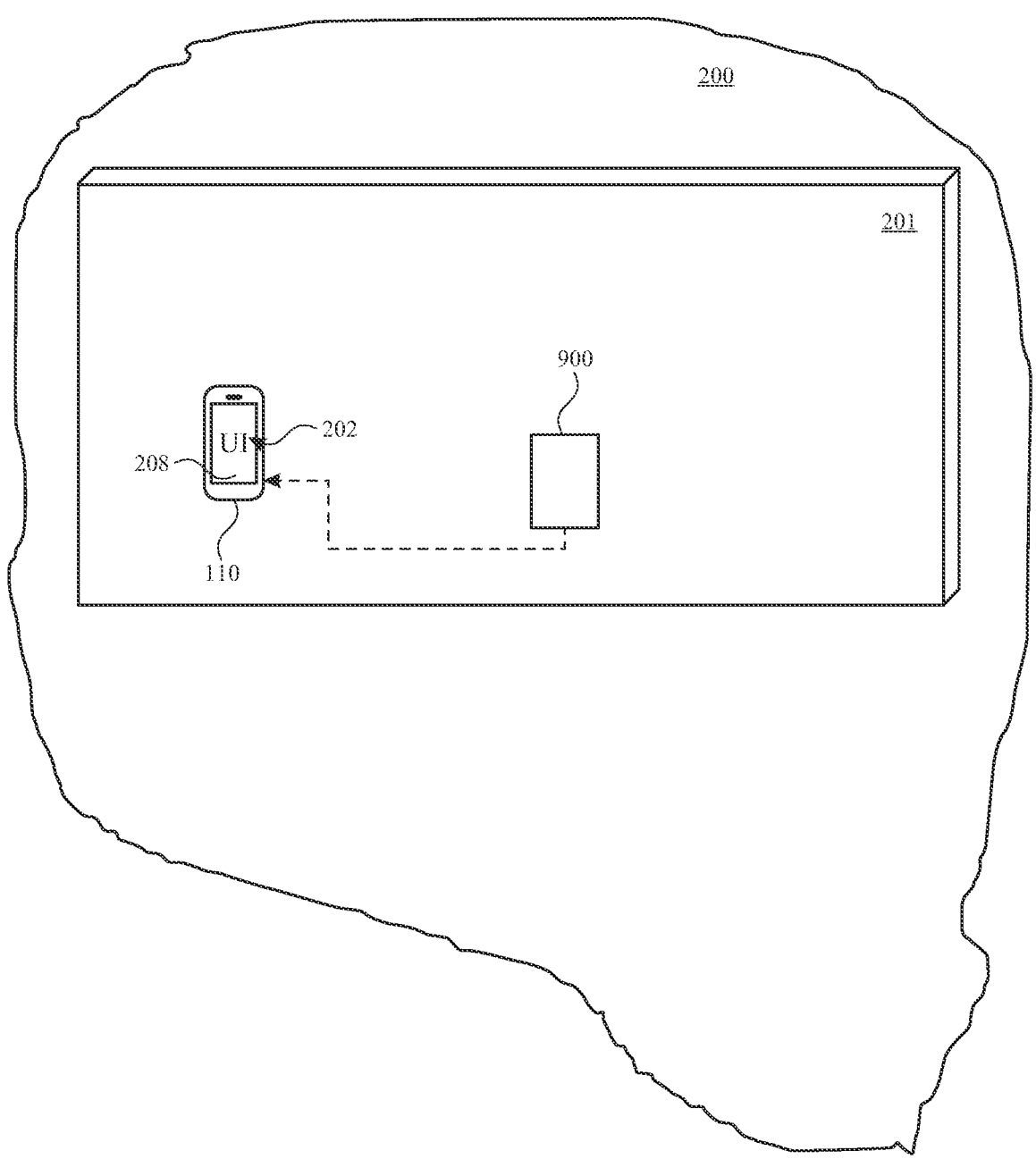
FIG. 9 illustrates a user interface generated by a first electronic device for input to an application running on another electronic device in accordance with one or more implementations of the subject technology.

FIG. 9 illustrates an example in which electronic device 105 can act as an input device to the UI 202 and the associated application at electronic device 110, while the UI 202 on the phone is being displayed within the view of the electronic device 105. This can be useful in circumstances in which, for example, the user and/or the system determine that the processing power of electronic device 110 can be used to operate the application corresponding to UI 202, while still allowing the user to leverage the XR environment to provide input to the UI 202. For example, user can be composing an email in UI 202 on electronic device 110, set electronic device 105 down on a table, put on electronic device 105, and continue composing the email using a supplemental user interface 900 displayed by display 201 of the electronic device 105.

In this example, the user 101 can provide gesture or other (e.g., voice) inputs to supplemental UI 900 displayed by display 201. The inputs to supplemental UI 900 are provided (e.g., by processor 500 of electronic device 105) to electronic device 110 (e.g., to one or more processors of the electronic device 110) for control of the application corresponding to UI 202 and/or updating of the UI 202. The supplemental UI 900 may be, for example, a reduced functionality interface relative to UI 202 (e.g., a virtual keypad, a virtual keypad with a text entry field in the example of an email application, or a virtual start button, virtual stop button, and virtual skip buttons for a media player application), or a UI that substantially mimics the UI 202 but without overlaying the UI 202 (in this example).

In this example, the user 101 can provide additional input to electronic device 105 (e.g., a movement of the supplemental UI 900) to transfer control of the editing of the email to electronic device 105. Transferring control to electronic device 105 may include launching a corresponding application at electronic device 105, closing or deactivating the UI 202 on electronic device 110, and upgrading the supplemental UI 900 to a primary UI (e.g., UI 302 discussed herein) for composing the email (e.g., using processor 500 of electronic device 105).

In the examples described herein in connection with, for example, FIGS. 2-9, smooth and continuous transfer of control of applications is provided between an electronic device such as electronic device 110 and electronic device 105, using the location, orientation, and/or display characteristics of the electronic device. In other examples, electronic device 105 can use the detected position, location, and/or display characteristics of a first electronic device (e.g., electronic device 110) and a detected position, location, and/or other characteristics of a second electronic device (e.g., a smart speaker device 160, a set-top box, or another electronic device such as electronic device 115, a laptop, etc.), along with input (e.g., gesture input, voice input, eye tracking input, etc.) to the electronic device 105, to transfer continuous control between the first device and the second device.

Figure 10:
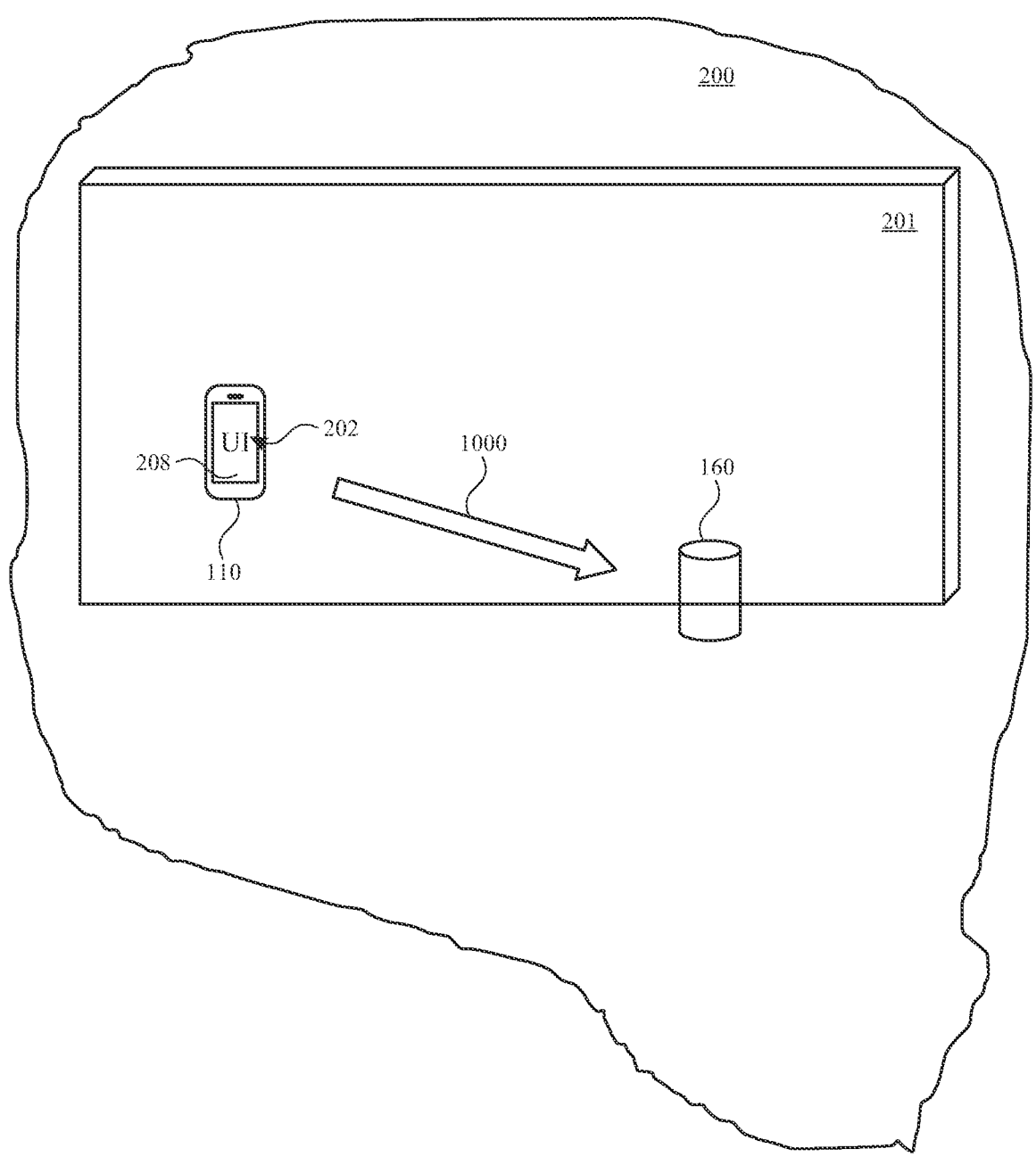
FIG. 10 illustrates continuous transfer of control from one electronic device to another electronic device using location-based input to a third electronic device in accordance with one or more implementations of the subject technology.

For example, FIG. 10 illustrates a scenario in which UI 202 is displayed by display 208, and an input (indicated by arrow 1000) is provided to electronic device 105, the input indicating motion from a detected location of electronic device 110 to or toward a detected location of smart speaker device 160 (e.g., or any other device such as electronic device 115, handheld electronic device 104, a set-top box, a desktop computer, etc.). In this example, the UI 202 may be a UI of a media player application that is playing a song. In this example, the user input may be a hand gesture in which the user moves their hand from a location corresponding to the location of the electronic device 110 to a location corresponding to the location of smart speaker device 160, or may be an eye-tracking input in which electronic device 105 detects user 101 looking from the location of the electronic device 110 to the location of smart speaker device 160. In another example, electronic device 105 may detect a user pinch gesture at a location associated with the location of the electronic device 110 and a release gesture at or near the location of the smart speaker device 160. Electronic device 105 may detect the user input using one or more camera(s) 150 and/or one or more sensors 152 (e.g., one or more depth sensors, and/or one or more eye-tracking sensors).

Responsive to the detected input corresponding to arrow 1000, electronic device 105 may obtain state information for the UI 202 and the corresponding application (e.g., the name of a song and a current playback time of the song) from electronic device 110, provide an indication to electronic device 110 to stop playback of the song by the application corresponding to UI 202, provide the state information to smart speaker device 160, and provide an indication to smart speaker device 160 to begin playback of the same song starting at the same playback time as determined by the state information. Electronic device 110 and/or smart speaker device 160 may store the song locally for playback, or may obtain the song from a remote location (e.g., from the other of electronic device 110 or smart speaker device 160, from another electronic device in system architecture 100, or from a server such as server 120). In one or more implementations, the electronic device 110 may fade out playback of the song as the smart speaker device 160 synchronously fades in playback of the song. In one example implementation, electronic device 105 may initiate a transfer of playback of a song from electronic device 110 to smart speaker device 160 (or vice versa) by detecting an input including motion between the location of the electronic device 110 and the location of the smart speaker device 160 (or vice versa), and providing an indication to server 120 to discontinue streaming the song to electronic device 110 and to continue streaming to song playback of the song by smart speaker device 160.

In some circumstances, transfer of control of an application can be transferred directly between devices such as electronic device 110, electronic device 115, and/or smart speaker device 160 based on proximity between the devices. However, using the capabilities of electronic device 105 to detect the locations of devices in the physical environment of the electronic device 105 (e.g., using camera(s) 150 and/or sensors 152), continuous transfer of control can be provided between the devices without moving the devices, without direct input from the user to either device, and without requiring proximity between the two devices.

Figure 11:
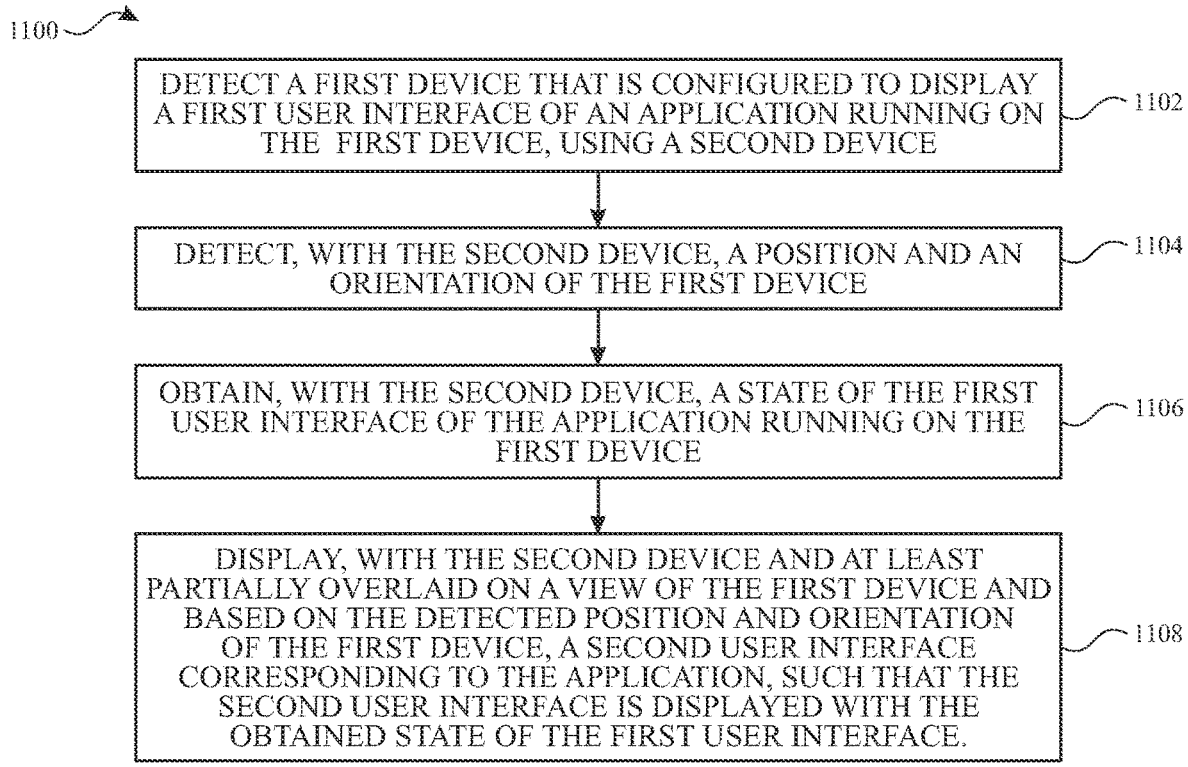
FIG. 11 illustrates a flow chart of an example process for continuous transfer between devices in accordance with one or more implementations of the subject technology.

FIG. 11 illustrates a flow diagram of an example process 1100 for continuous transfer of control between electronic devices using location information, in accordance with one or more implementations of the subject technology. For explanatory purposes, the process 1100 is primarily described herein with reference to the electronic device 105 of FIG. 1. However, the process 1100 is not limited to the electronic device 105 of FIG. 1, and one or more blocks (or operations) of the process 1100 may be performed by one or more other components of other suitable devices, including the electronic device 110, the electronic device 115, and/or the servers 120. Further for explanatory purposes, some of the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

As illustrated in FIG. 11, at block 1102, a first device (e.g., electronic device 110) that is configured to display a first user interface (e.g., UI 202) of an application running on the first device is detected by a second device such as electronic device 105 (e.g., using camera(s) 150 and/or sensors 152).

At block 1104, the second device detects (e.g., using camera(s) 150 and/or sensors 152) a position and an orientation of the first device. For example, depth sensors included in sensors 152 can be used to determine the position and the orientation of electronic device as indicated in FIG. 5).

At block 1106, the second device obtains a state of the first user interface of the application running on the first device. The second device can obtain the state of the first user interface by capturing images of the first user interface and/or by communicating with the first electronic device to obtain the state of the application and/or the first user interface. The state of the first user interface may include partially completed text input that has been provided to the first user interface, a color, a texture, or a theme of the user interface itself, and/or other information that describes the content and the appearance of the first user interface as currently displayed by the first device.

At block 1108, the second device displays, at least partially overlaid on a view of the first device and based on the detected position and orientation of the first device, a second user interface (e.g., UI 302) corresponding to the application. The second user interface is displayed with the obtained state of the first user interface. Displaying the second user interface may include displaying the second user interface at least partially overlaid on a view of a display (e.g., display 208) of the first device at least temporarily while the display of the first device displays the first user interface (e.g., as illustrated in FIGS. 2, 6, and/or 7).

In some implementations, the second device may track (e.g., using eye-tracking cameras and/or sensors in sensors 152) a gaze direction of at least one eye of a user, and may display the second user interface responsive to a detection of the gaze direction corresponding to the detected position of the first device while the first user interface is displayed by the first device. For example, when a user 101 wearing electronic device 105 is determined, by eye tracking sensors of electronic device 105, to be looking at the first user interface displayed on electronic device 110, electronic device 105 can responsively generate the second user interface overlaid on the user's view of the first user interface.

The first user interface, the application corresponding thereto, and/or the display (e.g., display 208) of the first device may be deactivated when the second device displays the second user interface, when the user interacts with the second user interface, when the second user interface is moved away from the location of the first device by the user, or after a period of time following the time when the second user interface is generated (as examples). In one example, (e.g., responsive to a user gesture input or eye tracking input) the second device may display the second user interface at a location away from the view of the first device (e.g., as illustrated in FIG. 4 or FIG. 9), may provide an indication to the first device (e.g., electronic device 110) to deactivate the application at the first device, and may activate a local copy of the application at the second device (e.g., for control of the application via the second user interface).

The second device may also receive an input to the second user interface (e.g., using camera(s) 150 and/or sensors 152 to detect a user gesture at a location corresponding to a displayed location of the UI 302). The second device may also provide the received input to the application running on the first device for control of the application running on the first device (e.g., as described above in connection with FIG. 7 or FIG. 9).

The second device may also identify a change to the first user interface, the change being responsive to a user input to the first device (e.g., as indicated in FIG. 6); and update the second user interface (e.g., UI 302) based on the identified change to the first user interface. The second device may include at least one camera (e.g., camera(s) 150), and identifying the change to the first user interface may include identifying the change to the first user interface using the at least one camera (e.g., using an image of display 208 from the camera). Identifying the change to the first user interface may also, or alternatively, include identifying the change to the first user interface based on a communication received from the first device (e.g., a wireless communication from the electronic device 110 to electronic device 105) responsive to the user input to the first user interface at the first device.

The second device may also receive a gesture input (e.g., using camera(s) 150 and/or sensors 152) from a user to the second user interface and may provide an input based on the detected gesture input to the first device for control of the application running on the first device, in some examples.

Figure 12:
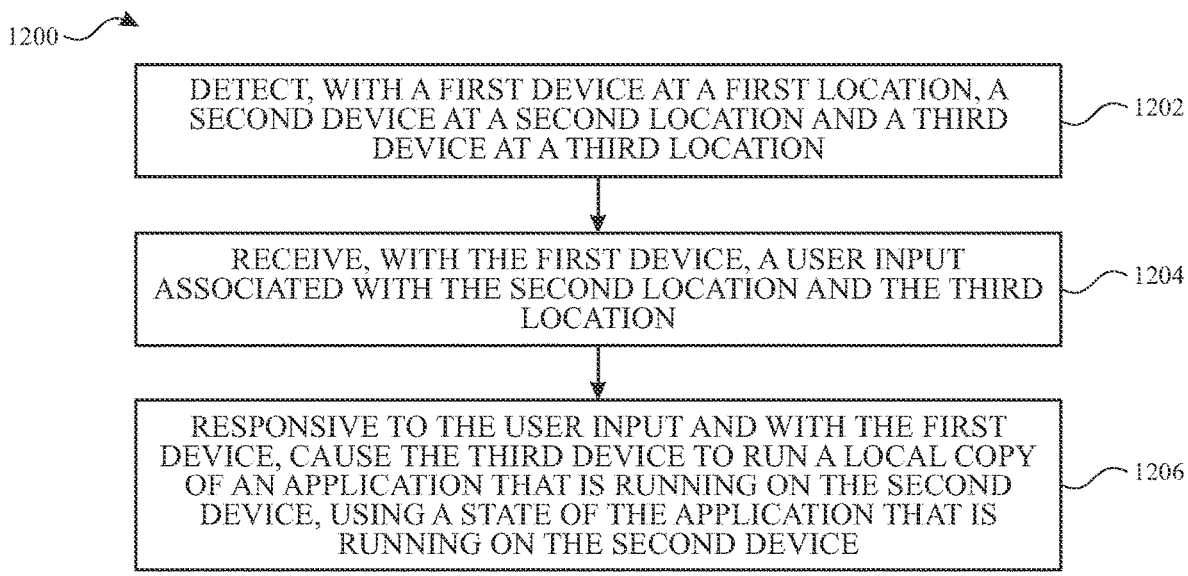
FIG. 12 illustrates a flow chart of an example process for continuous transfer from one electronic device to another electronic device using location-based input to a third electronic device in accordance with one or more implementations of the subject technology.

FIG. 12 illustrates a flow diagram of another example process 1200 for continuous transfer of control between electronic devices using location information, in accordance with one or more implementations of the subject technology. For explanatory purposes, the process 1200 is primarily described herein with reference to the electronic device 105 of FIG. 1. However, the process 1200 is not limited to the electronic device 105 of FIG. 1, and one or more blocks (or operations) of the process 1200 may be performed by one or more other components of other suitable devices, including the electronic device 110, the electronic device 115, and/or the servers 120. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

As illustrated in FIG. 12, at block 1202, a first device (e.g., electronic device 105, such as a smartphone, a tablet, or a head mountable device) at a first location detects a second device (e.g., electronic device 110) at a second location and a third device (e.g., smart speaker device 160 or a set-top box) at a third location (e.g., locations in a physical environment such as physical environment 200 of FIG. 10). In some scenarios, the second location and the third location may be spaced apart by a distance that is larger than the distance within which near-field communications between the second device and the third device can be exchanged.

At block 1204, the first device receives a user input (e.g., as illustrated by arrow 1000 of FIG. 10) associated with the second location and the third location (e.g., a gesture input moving from the first location to the second location, or an eye tracking movement of a gaze location from the first location to the second location).

At block 1206, responsive to the user input, the first device causes the third device to run a local copy of an application that is running on the second device, using a state of the application that is running on the second device. For example, as described above in connection with FIG. 10, the second device may be a smart phone, the third device may be a smart speaker device, the application may be a media player application, and the state of the application may include an identifier of media (e.g., a song or a video) being played by the media player application and a playback time of the media (e.g., the current playback time at the time of the received input). In this example, causing the third device (e.g., smart speaker device 160) to run the local copy of the application that is running on the second device, using the state of the application that is running on the second device, may include causing the smart phone to stop playing the media and causing the smart speaker device to begin playing the media beginning at the playback time. In this way, continuous play of the media can be transferred from one device to another device, based on a location-based input to electronic device 105.

In some implementations, causing the third device to run the local copy of the application using the state of the application includes obtaining, with the first device, the state of an application running on the second device (e.g., using camera(s) 150 or via wireless communications between the electronic device 105 and the electronic device 110); providing, with the first device, the state of the application running on the second device to the third device (e.g., via wireless communications between the electronic device 105 and the smart speaker device 160); providing, with the first device, an indication to the third device to run the local copy of the application beginning with the provided state of the application (e.g., via wireless communications between the electronic device 105 and the smart speaker device 160); and providing an indication to the second device (e.g., via wireless communications between the electronic device 105 and the electronic device 110) to deactivate the application at the second device. Deactivating the application may include closing the application, or keeping the application open in an inactive state of the application and/or an inactive state of the device. Deactivating the application may also include deactivating the display of the second device (e.g., by operating the display in a low power mode or by powering off the display), in some implementations.

In some implementations, causing the third device to run the local copy of the application using the state of the application may include providing, with the first device, an indication to a server (e.g., server 120) that is communicatively coupled to the first device, the second device, and the third device of a user instruction to transfer control of the application from the second device to the third device. For example, in one implementation, the application running on the electronic device 110 may be a media player application that controls streaming of media from server 120 to electronic device 110. While the media player application is streaming a song to the electronic device 110 from server 120, the user of electronic device 105 may gesture from the electronic device 110 toward smart speaker device 160. Upon detecting this gesture, electronic device 105 may provide an indication to the server 120 to transfer the control of the streaming of the song from electronic device 110 to a media player application at the smart speaker device 160. In this example, server 120 may provide instructions to electronic device 110 and/or smart speaker device to end and/or begin streaming of the song.

As described above, one aspect of the present technology is the gathering and use of data available from specific and legitimate sources for continuous transfer of control of applications and/or user input between electronic devices. The present disclosure contemplates that in some instances, this gathered data may include personal information data that uniquely identifies or can be used to identify a specific person. Such personal information data can include video data, three-dimensional geometry data, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for continuous transfer of control of applications, content, and/or user input between electronic devices with an XR system.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of transferring content and/or control between devices, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 13:
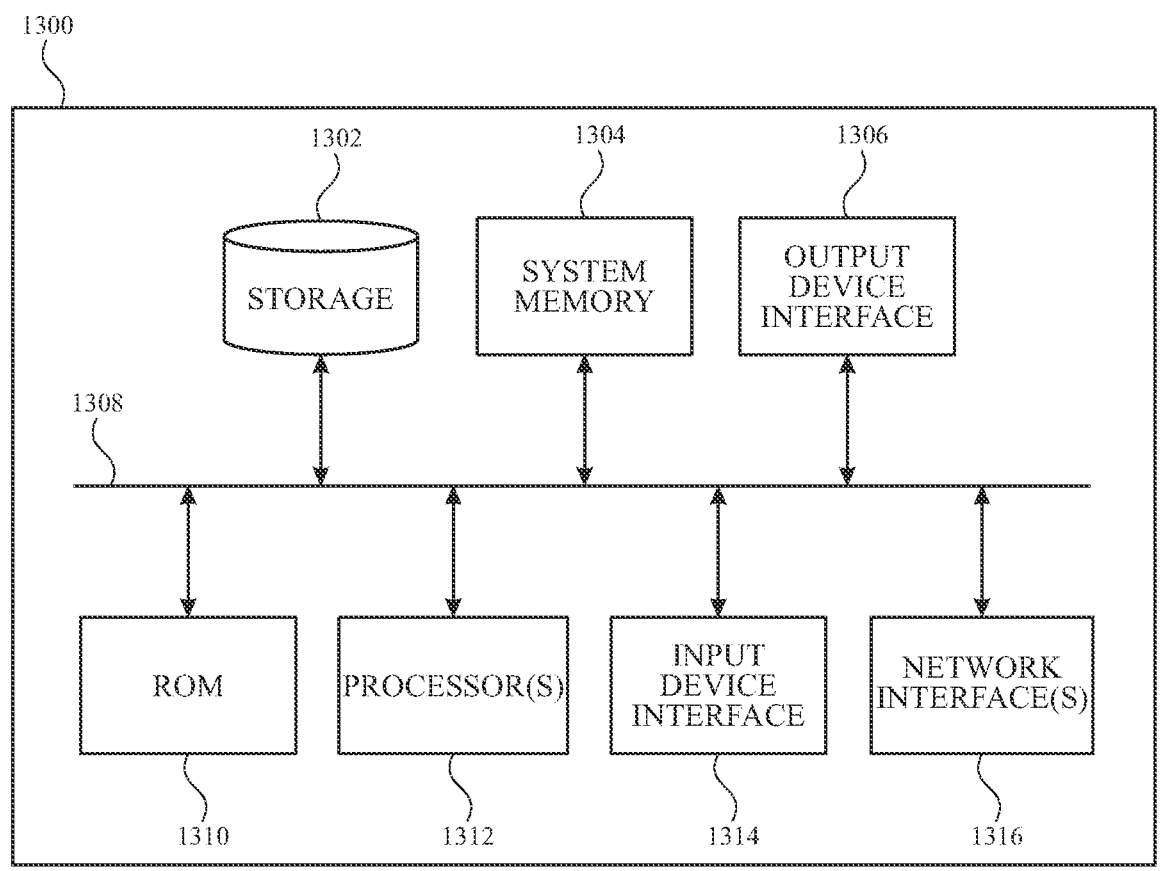
FIG. 13 illustrates an electronic system with which one or more implementations of the subject technology may be implemented.

FIG. 13 illustrates an electronic system 1300 with which one or more implementations of the subject technology may be implemented. The electronic system 1300 can be, and/or can be a part of, the electronic device 105, the handheld electronic device 104, the electronic device 110, the electronic device 115, the smart speaker device 160, and/or the server 120 as shown in FIG. 1. The electronic system 1300 may include various types of computer readable media and interfaces for various other types of computer readable media. The electronic system 1300 includes a bus 1308, one or more processing unit(s) 1312, a system memory 1304 (and/or buffer), a ROM 1310, a permanent storage device 1302, an input device interface 1314, an output device interface 1306, and one or more network interfaces 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system 1300. The permanent storage device 1302, on the other hand, may be a read-and-write memory device. The permanent storage device 1302 may be a non-volatile memory unit that stores instructions and data even when the electronic system 1300 is off. In one or more implementations, a mass-storage device (such as a magnetic or optical disk and its corresponding disk drive) may be used as the permanent storage device 1302.

In one or more implementations, a removable storage device (such as a floppy disk, flash drive, and its corresponding disk drive) may be used as the permanent storage device 1302. Like the permanent storage device 1302, the system memory 1304 may be a read-and-write memory device. However, unlike the permanent storage device 1302, the system memory 1304 may be a volatile read-and-write memory, such as random access memory. The system memory 1304 may store any of the instructions and data that one or more processing unit(s) 1312 may need at runtime. In one or more implementations, the processes of the subject disclosure are stored in the system memory 1304, the permanent storage device 1302, and/or the ROM 1310 (which are each implemented as a non-transitory computer-readable medium). From these various memory units, the one or more processing unit(s) 1312 retrieves instructions to execute and data to process in order to execute the processes of one or more implementations.

The bus 1308 also connects to the input and output device interfaces 1314 and 1306. The input device interface 1314 enables a user to communicate information and select commands to the electronic system 1300. Input devices that may be used with the input device interface 1314 may include, for example, alphanumeric keyboards and pointing devices (also called "cursor control devices"). The output device interface 1306 may enable, for example, the display of images generated by electronic system 1300. Output devices that may be used with the output device interface 1306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks and/or to one or more network nodes, such as the electronic device 110 shown in FIG. 1, through the one or more network interface(s) 1316. In this manner, the electronic system 1300 can be a part of a network of computers (such as a LAN, a wide area network ("WAN"), or an Intranet, or a network of networks, such as the Internet. Any or all components of the electronic system 1300 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, method is provided that includes detecting a first device that is configured to display a first user interface of an application running on the first device, using a second device; detecting, with the second device, a position and an orientation of the first device; obtaining, with the second device, a state of the first user interface of the application running on the first device; and displaying, with the second device and at least partially overlaid on a view of the first device and based on the detected position and orientation of the first device, a second user interface corresponding to the application. The second user interface is displayed with the obtained state of the first user interface.

In accordance with aspects of the disclosure, a system is provided that includes a first device configured to display a first user interface of an application running on the first device; and a second device configured to display computer generated content overlaid on a view of a physical environment. The second device is further configured to detect a position and an orientation of the first device in the physical environment; obtain a state of the first user interface of the application running on the first device; and display, at least partially overlaid on a view of the first device and based on the detected position and orientation of the first device, a second user interface corresponding to the application. The second user interface is displayed with the obtained state of the first user interface.

In accordance with aspects of the disclosure, a method is provided that includes detecting, with a first device at a first location, a second device at a second location and a third device at a third location; receiving, with the first device, a user input associated with the second location and the third location; and responsive to the user input and with the first device, causing the third device to run a local copy of an application that is running on the second device, using a state of the application that is running on the second device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method, comprising:
   detecting a first device that is displaying a first user interface of an application running on the first device, using a second device;
   detecting, with the second device, a position and an orientation of the first device;
   obtaining, with the second device, a state of the first user interface of the application running on the first device;
   providing an indication to the first device to deactivate the application at the first device independent of deactivating a display of the first device;
   activating a local version of the application at the second device; and
   displaying, with the second device and at least partially overlaid on a view of the first device and based on the detected position and orientation of the first device, a second user interface corresponding to the local version of the application,
   wherein the second user interface is displayed with the obtained state of the first user interface, the obtained state indicating at least one of: user input received at the first user interface of the application running on the first device, or data accessed by the application running on the first device.

2. The method of claim 1, wherein the displaying the second user interface comprises displaying the second user interface at least partially overlaid on a view of a display of the first device at least temporarily while the display of the first device displays the first user interface.

3. The method of claim 2, further comprising:
   receiving, with the second device, an input to the second user interface; and
   providing the received input to the application running on the first device for control of the application running on the first device.

4. The method of claim 2, further comprising:
   identifying, with the second device, a change to the first user interface, the change being responsive to a user input to the first device; and
   updating the second user interface based on the identified change to the first user interface.

5. The method of claim 4, wherein the second device comprises at least one camera, and wherein identifying the change to the first user interface comprises identifying the change to the first user interface using the at least one camera.

6. The method of claim 4, wherein identifying the change to the first user interface comprises identifying the change to the first user interface based on a communication received from the first device responsive to the user input to the first user interface at the first device.

7. The method of claim 1, further comprising deactivating a display of the first device when the second device displays the second user interface.

8. The method of claim 1, further comprising, after displaying the second user interface at least partially overlaid on the view of the first device:
   displaying, with the second device, the second user interface at a location away from the view of the first device;

providing the indication to the first device to deactivate the application at the first device; and
activating the local version of the application at the second device.

9. The method of claim 1, further comprising:
detecting a gesture input, with the second device, from a user to the second user interface; and
providing an input based on the detected gesture input to the first device for control of the application running on the first device.

10. The method of claim 1, further comprising:
tracking, with the first device, a gaze direction of at least one eye of a user; and
displaying the second user interface responsive to a detection of the gaze direction corresponding to the detected position of the first device while the first user interface is displayed by the first device.

11. A system, comprising:
a first device configured to display a first user interface of an application running on the first device; and
a second device configured to display computer generated content overlaid on a view of a physical environment, wherein the second device is further configured to:
detect a position and an orientation of the first device in the physical environment;
obtain a state of the first user interface of the application running on the first device;
provide an indication to the first device to deactivate the application at the first device independent of deactivating a display of the first device;
activating a local version of the application at the second device; and
display, at least partially overlaid on a view of the first device and based on the detected position and orientation of the first device, a second user interface corresponding to the local version of the application, wherein the second user interface is displayed with the obtained state of the first user interface, the obtained state indicating at least one of:
user input received at the first user interface of the application running on the first device, or data accessed by the application running on the first device.

12. The system of claim 11, wherein the second device is configured to:
receive a user input; and
responsive to the user input:
move the second user interface from a first location on a display of the second device to a second location on the display of the second device responsive to the user input;
operate an application, at the second device, that corresponds to the application running on the first device; and
provide the indication to the first device to deactivate the application at the first device.

13. The system of claim 11, wherein the application is a content editor application, and wherein the state of the first user interface comprises:
content previously input to the first device that is currently displayed in the first user interface; and
an active indicator of an area within the first user interface for input of additional content.

14. The system of claim 13, wherein the content editor application comprises a text entry field, and wherein the active indicator comprises a cursor in the text entry field.

15. The system of claim 11, wherein the application is a media player application, and wherein the state of the first user interface comprises:
an indicator of media that is currently being played by the first device; and
an indicator of a current playback time of the media in the media player application.

16. The system of claim 11, wherein the application is a social media application, and wherein the state of the first user interface comprises an indication of a selectable link displayed in the social media application.

17. A non-transitory computer-readable medium storing instructions which, when executed by one or more processors, cause the one or more processors to perform operations comprising:
detecting a first device that is displaying a first user interface of an application running on the first device, using a second device;
detecting, with the second device, a position and an orientation of the first device;
obtaining, with the second device, a state of the first user interface of the application running on the first device;
providing an indication to the first device to deactivate the application at the first device independent of deactivating a display of the first device;
activating a local version of the application at the second device; and
displaying, with the second device and at least partially overlaid on a view of the first device and based on the detected position and orientation of the first device, a second user interface corresponding to the local version of the application,
wherein the second user interface is displayed with the state of the first user interface, the state indicating at least one of: user input received at the first user interface of the application running on the first device, or data accessed by the application running on the first device.

18. The non-transitory computer-readable medium of claim 17, wherein the operations further comprise:
detecting a gesture input, with the second device, from a user to the second user interface; and
providing an input based on the detected gesture input to the local version of the application running at the second device.

19. The non-transitory computer-readable medium of claim 17, wherein the operations further comprise, after displaying the second user interface at least partially overlaid on the view of the first device:
displaying, with the second device, the second user interface at a location away from the view of the first device; and
activating the local version of the application at the second device.

20. The non-transitory computer-readable medium of claim 17, wherein the operations further comprise:
tracking, with the first device, a gaze direction of at least one eye of a user; and
displaying the second user interface responsive to a detection of the gaze direction corresponding to the detected position of the first device while the first user interface is displayed by the first device.

* * * * *